US011722890B2

(12) United States Patent
Rajadura et al.

(10) Patent No.: US 11,722,890 B2
(45) Date of Patent: Aug. 8, 2023

(54) METHODS AND SYSTEMS FOR DERIVING CU-UP SECURITY KEYS FOR DISAGGREGATED GNB ARCHITECTURE

(71) Applicant: Samsung Electronics Co., Ltd., Suwon-si (KR)

(72) Inventors: Rajavelsamy Rajadura, Bangalore (IN); Rohini Rajendran, Bangalore (IN); Nivedya Parambath Sasi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 17/443,422

(22) Filed: Jul. 26, 2021

(65) Prior Publication Data

US 2022/0030425 A1 Jan. 27, 2022

(30) Foreign Application Priority Data

Jul. 27, 2020 (IN) .............................. 202041032179
Jul. 8, 2021 (IN) .............................. 202041032179

(51) Int. Cl.
*H04W 12/04* (2021.01)
*H04W 12/041* (2021.01)
(Continued)

(52) U.S. Cl.
CPC ....... *H04W 12/041* (2021.01); *H04W 12/033* (2021.01); *H04W 12/043* (2021.01); *H04W 12/106* (2021.01)

(58) Field of Classification Search
None
See application file for complete search history.

(56) References Cited

U.S. PATENT DOCUMENTS

2013/0343280 A1* 12/2013 Lee .................. H04L 63/20
370/328
2018/0343249 A1* 11/2018 Hahn ................ H04L 63/0869
(Continued)

FOREIGN PATENT DOCUMENTS

CN 111052675 A 4/2020
WO WO-2019023632 A1 * 1/2019
(Continued)

OTHER PUBLICATIONS

Office Action dated Jun. 24, 2022 in connection with India Patent Application No. 202041032179, 5 pages.
(Continued)

*Primary Examiner* — Benjamin E Lanier

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Methods and systems for generating/deriving CU-UP security keys for disaggregated gNB architecture are described herein. A UE/gNB can inform the gNB/UE about the capability of the UE/gNB to derive CU-UP security keys. CU-UP security keys comprise an integrity protection key and a ciphering key. The gNB derives an integrity protection key and a ciphering key upon determining that the UE supports derivation of the CU-UP security keys or the UE has capability to derive CU-UP security keys. The integrity protection key protects the integrity of data, in a DRB, traversing through a CU-UP. The ciphering key encrypts the data, in the DRB, traversing through the CU-UP. The gNB
(Continued)

sends RRC connection reconfiguration messages, which include multiple parameters. The UE derives an integrity protection key and a ciphering key, for each DRB, based on the plurality of parameters, for protecting the integrity of the data and encrypting the data.

10 Claims, 12 Drawing Sheets

(51) Int. Cl.
*H04W 12/033* (2021.01)
*H04W 12/106* (2021.01)
*H04W 12/043* (2021.01)

(56) References Cited

U.S. PATENT DOCUMENTS

| | | | |
|---|---|---|---|
| 2019/0098495 A1 | 3/2019 | Tenny et al. | |
| 2019/0246282 A1 | 8/2019 | Li et al. | |
| 2019/0253881 A1* | 8/2019 | Gage | H04W 12/03 |
| 2019/0394651 A1 | 12/2019 | Wifvesson et al. | |
| 2020/0037165 A1 | 1/2020 | Kunz et al. | |

FOREIGN PATENT DOCUMENTS

| | | | |
|---|---|---|---|
| WO | 2019/033905 A1 | 2/2019 | |
| WO | WO-2019184832 A1 * | 10/2019 | H04L 9/0861 |

OTHER PUBLICATIONS

International Search Report and Written Opinion of the International Searching Authority in connection with International Application No. PCT/KR2021/009648 dated Nov. 1, 2021, 6 pages.

3GPP TS 33.501 V16.3.0 (Jul. 2020), Technical Specification, 3rd Generation Partnership Project; Technical Specification Group Services and System Aspects; Security architecture and procedures for 5G system (Release 16), Jul. 10, 2020, 248 pages.

Apple, "New solution on enabling UP IP for capability limited UE", S3-201008, 3GPP TSG-SA WG3 Meeting #99e, E-meeting, May 11-15, 2020, 3 pages.

China Telecom, "Discussion on the Support of Multi-CU-UP connectivity in Rel-17", S3-200946, 3GPP TSG-SA3 Mleeting #99e, E-meeting, May 11-15, 2020, 3 pages.

* cited by examiner

METHODS AND SYSTEMS FOR DERIVING CU-UP SECURITY KEYS FOR DISAGGREGATED GNB ARCHITECTURE

CROSS REFERENCE TO RELATED APPLICATIONS

This application is based on and claims priority under 35 U.S.C. 119(a) of Indian Provisional patent application number 202041032179, filed on Jul. 27, 2020, in the Indian Patent Office, and of a Indian Non-Provisional patent application number 202041032179, filed on Jul. 8, 2021, in the Indian Patent Office, the disclosure of each of which is incorporated by reference herein in its entirety.

BACKGROUND

1. Field

Embodiments herein relate to generation of Centralized Unit-User Plane (CU-UP) security keys, and more particularly to methods and systems for generating unique integrity protection keys or ciphering keys for each CU-UP associated with a CU-Control Plane (CU-CP) of a Next Generation Node B (gNB).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A Next Generation Node B (gNB) with a disaggregated architecture can provide support for multiple Centralized Unit-User Planes (CU-UPs), if it is determined that the support is necessary or is essential in certain deployment scenarios. The CU-UPs may be deployed in different entities. The entities may be in same location or in different locations, and security mechanisms used in the entities may belong to the same or different domains. FIG. 1 depicts an example topology of a $5^{th}$ Generation (5G) Radio Access Network (RAN) 100, wherein there is support provided for multiple CU-UPs. The CU-UPs can be located in different security domains. As depicted in FIG. 1, there are three security domains 101, 103, and 105 and the gNB of the 5G-RAN comprises four CU-UPs, including CU-Ups 107, 109, 111 and 113. According to some embodiments can be at least one CU-UP in each security domain. The gNB includes a CU-CP 115, which is connected to each of the four CU-UPs through dedicated interfaces (E1 interface). The deployment of the multiple CU-UPs across different entities may result in issues relevant to data security, particularly if the same security keys are used by the four CU-UPs in the different entities (using security mechanisms belonging to same or different security domains) for data integrity protection or data ciphering.

Existing mechanisms for generating keys for data integrity protection or data ciphering may utilize Key Derivation Function (KDF), wherein a plurality of independent variables are provided as input to the KDF to generate either an integrity protection key ($K_{UPint}$) or a ciphering key ($K_{UPenc}$). The independent variables include key generation technique type distinguishers, key generation technique identity, Access Stratum (AS) root keys or gNB keys ($K_{gNB}$). The gNB in $K_{gNB}$ may be a gNB with a disaggregated architecture and the UP in $K_{UPint}$ and $K_{UPenc}$ refers to CU-UPs of the gNB. It is to be noted that, in some embodiments, the same $K_{UPint}$ and $K_{UPenc}$ may be used for all CU-UPs of the gNB, irrespective of the location of the CU-UPs and the security domain of the security mechanisms used by the CU-UPs.

FIG. 2 depicts an example topology 200 of a 5G-RAN wherein data security vulnerabilities are introduced at CU-UPs due to use of a common security key at all the CU-UPs. As depicted in FIG. 2, the CU of the gNB in the 5G RAN comprises two CU-UPs, CU-UP' 201 and CU-UP" 203, and a CU-CP 205. CU-CP 205 and the CU-UP' 201 are located in an Edge Data Center (EDC)-1 207, and the CU-UP" 203 is located in an EDC-2 209. EDC-1 207 and EDC-2 209 may utilize security mechanisms of same or different cloud platforms or administrative domains, resulting in different levels of security at EDC-1 207 and EDC-2 209. The locations of EDC-1 207 and EDC-2 209 may be same or different. The integrity protection key ($K_{UPint}$) or the ciphering key ($K_{UPenc}$) used by CU-UP' 201 and CU-UP" 203 is, in certain cases, the same. In this example, the data received by the gNB belongs to application(s) which have to be routed either through the enhanced Mobile Broadband (eMBB) network slice or the Ultra-Reliable Low-Latency Communication (URLLC) (for meeting Quality of Service (QoS) commitments of the data flows).

In some cases, CU-UP' 201 (located in EDC-1 207) is included in an eMBB network slice and CU-UP" 203 (located in EDC-2 209) is included in an URLLC network slice. In this arrangement, the security of either CU-UP, i.e., CU-UP' 201 or CU-UP" 203 is vulnerable to compromise in the security of the other CU-CP. If either $K_{UPint}$ or $K_{UPenc}$ is compromised at the location hosting CU-UP' 201 or at the entity EDC-1 207, then the security of CU-UP" 203 will be compromised. The vulnerabilities (at CU-UP' 201 and CU-UP" 203) are introduced due to lack of support for isolation of the integrity protection key ($K_{UPint}$) or the ciphering key ($K_{UPenc}$) at CU-UP' 201 or CU-UP" 203. To solve this weakness, maintenance of same level of security at each of the CU-UPs through compartmentalization may be required. Such compartmentalization would prevent propagation of security breaches (compromises in security). For example, a security compromise at one CU-UP may not lead to compromise in the security of other CU-UPs of the gNB.

However, maintenance of same level of security at each of the CU-UPs through compartmentalization and isolation of CU-UP security keys at the individual CU-UPs may not be achievable, since, as per existing $3^{rd}$ Generation Partnership Project (3GPP) specifications, the derivation of ($K_{UPint}$ and $K_{UPenc}$) for Data Radio Bearer (DRB) based on DRB Identity (DRB ID) as input may result in the generation of the same key multiple times. This is because, the repetition of DRB ID may be allowed for a particular $K_{gNB}$. The key used in a CU-UP of a gNB can be provided to another CU-UP of the gNB, as bearer setup in the each of the CU-UPs can be performed in sequence.

The derivation of the CU-UP security keys ($K_{UPint}$ and $K_{UPenc}$) in isolation, for each of the CU-UPs of a gNB, may reveal the RAN topology. The RAN topology may be revealed as the number of generated CU-UP keys indicates the number of CU-UPs belonging to the gNB (or to the operator's RAN). Since, concealment of the RAN topology involves an essential security requirement in the 3GPP systems, deriving $K_{UPint}$ and $K_{UPenc}$ for each CU-UP is likely to expose the RAN topology (such as exposing whether a particular Data Network Name (DNN) or network slice is handled by different CU-UPs or the mechanism of deployment of the CU-UPs by a Public Land Mobile Network (PLMN) or number of CU-UPs deployed by the operator in the RAN).

Further, the derivation of $K_{UPint}$ and $K_{UPenc}$ for each Protocol Data Unit (PDU) session using PDU session ID may result in the generation of the same CU-UP key multiple times, as a single PDU session may be handled by different CU-UPs of the gNB.

A user may not intend to share the $K_{UPint}$ or $K_{UPenc}$ with 3rd party application providers (such as applications whose data is routed through specific slices or CU-UPs) due to concerns of potential security breaches by the $3^{rd}$ party application providers. Such security concerns may exist irrespective of whether the CU-UPs are in the same location.

FIG. 3a depicts an example scenario 300, wherein CU-UPs of a gNB are present in the same centralized location (CU) 303. As depicted in FIG. 3a, CU-UP-1 305a and CU-UP-2 305b are present in the same virtualized centralized environment. It is to be noted that the level of confidence or trust of an user in CU-UP-1 305a and CU-UP-2 305b may not be same, wherein the confidence of the operator in CU-UP-2 305b is lower than that on CU-UP-1 305a. This may be due a $3^{rd}$ party application provider handling specific slices at the CU-UP-2 305b or controlling the whole of CU-UP-2 305b. Besides, CU-UP-2 305b may be hosted in a different cloud platform provided by a different vendor, or CU-UP-2 305b may be hosted along with an Application Function/Server, wherein administrative privileges are shared by the operator and an edge service provider. The operator may consider that there is scope of compromise of the security at CU-UP-1 305a, if there is a potential security breach in CU-UP-2 305b.

FIG. 3b depicts an example scenario, wherein the CU-UPs of a gNB 351 are present in different centralized locations. As depicted in FIG. 3b, both CU-UP-1 353 and CU-UP-2 355 are situated in the same virtualized centralized environment (CU). However, the CU-UP-1 353 and CU-UP-2 355 are present at different locations (for example, first centralized location 357 and second centralized location 359) of the virtualized centralized environment. In this scenario, the operator holds similar or identical security concerns as in the scenario described in FIG. 3a. To address these security concerns, it may be appropriate to utilize security mechanisms belonging to different security domains at CU-UP-1 353 and CU-UP-2 355. The existing mechanisms may not be able to ensure that security mechanisms belonging to different security domains may be used at the different locations of the virtualized centralized environment.

FIG. 3c depicts an example scenario 375, wherein a CU-UP of a gNB 377 is present in a distributed location (DU) 379, and another CU-CP 381 of the gNB is present in a centralized location (CU) 383. As depicted in FIG. 3c, the location of a certain CU-UP of gNB 377 may be a cause of security concern for the operator. Considering the scenario, in which CU-UP-2 385 is located at distributed location 379 and CU-UP-1 387 is located at centralized location 383, if the distributed location 379 is not secured completely (for example, from tampering, breaches, or compromises), the vulnerability of security at the site of CU-UP-1 387 will increase. This security concern exists irrespective of whether CU-UP-2 385 is handled by the same operator or a $3^{rd}$ party.

SUMMARY

Certain embodiments according to this disclosure provide methods and systems for generating, by a User Equipment (UE) and a Next Generation Node B (gNB), Centralized Unit-User Plane (CU-UP) security keys, wherein the gNB has a disaggregated architecture. The CU-UP security keys include an integrity protection key and a ciphering key, which are unique for each Data Radio Bearer (DRB). The UE can receive a Radio Resource Control (RRC) connection reconfiguration message from the gNB, which indicates activation of CU-CP security. The UE and the gNB can initiate protecting the integrity of data traversing through the CU-UPs in the DRBs and ciphering of the data traversing through the CU-UPs in the DRBs, if CU-CP security is activated. The gNB can initiate protecting the integrity of data and ciphering of the data on determining that the UE supports derivation of integrity protection key and ciphering key.

In at least one embodiment, the gNB can determine whether the UE has the capability to derive at least one integrity key and at least one ciphering key. The gNB can determine the capability to derive the at least one integrity key and the at least one ciphering key based on at least one of a parameter included in an Access Stratum (AS) release message received from the UE, and a parameter included in a message exchanged during either an AS procedure or a Non-AS (NAS) procedure. The gNB can also inform the UE about the capability of the gNB to generate the at least one integrity key and the at least one ciphering key, for each DRB, either in a RRC connection reconfiguration message, a registration accept message, an AS security mode command message, or a System Information Block (SIB) broadcast.

Certain embodiments according to this disclosure include methods including extracting a plurality of parameters from the RRC connection reconfiguration message. The parameters are specific for a particular DRB. In an embodiment, the parameters include at least one of a DRB Identity (ID), Protocol Data Unit (PDU) session ID, at least one Quality of service Flow Indicator (QFI), and a counter value. One or more QFIs can be mapped to a DRB. The counter value is a Counter-DgA (Disaggregated gNB Architecture) and is unique for each DRB. The counter value is maintained by the gNB for duration of AS security context between the gNB and the UE. The counter value is initialized when an AS root key is generated by the gNB, wherein the AS root key is reset by the gNB, by regenerating the AS root key prior to wrapping of counter value pertaining to the DRB. The counter value pertaining to the DRB is incremented after the generation of each integrity protection key and each ciphering key.

Embodiments according to this disclosure include methods which include generating the at least one integrity protection key and at least one CU-UP ciphering key, for each DRB, for protecting the integrity of the data and the ciphering the data, based on the plurality of parameters.

An object of certain embodiments described herein is to disclose methods and systems for generating/deriving Centralized Unit-User Plane (CU-UP) security keys for a disaggregated Next Generation Node B (gNB) architecture.

Another object of certain embodiments described herein is to inform, by a User Equipment (UE)/gNB, about the capability of the gNB/UE to derive CU-UP security keys, wherein the CU-UP security keys comprises an integrity protection key and a ciphering key.

Another object of various embodiments described herein is to derive, by the gNB, at least one integrity protection key and at least one ciphering key, for each Data Radio Bearer (DRB), on determining that the UE supports derivation of the CU-UP security keys (UE has capability to derive CU-UP security keys), wherein the at least one integrity protection key protects the integrity of data, in at least one DRB, traversing through at least one CU-UP, wherein the at least one ciphering key encrypts the data, in at least one DRB, traversing through the at least one CU-UP.

Objects of embodiments described herein include sending a Radio Resource Control (RRC) connection reconfiguration message, by the gNB, to indicate the UE about activation of CU-UP security, wherein the RRC connection reconfiguration message includes a plurality of parameters to enable the UE to derive at least one integrity protection key and at least one ciphering key, for each DRB.

An object of certain embodiments described herein is to derive at least one integrity protection key and at least one ciphering key, for each DRB, based on the plurality of parameters, for protecting the integrity and confidentiality of the data.

These and other aspects of the embodiments described herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, through out which like reference letters indicate corresponding parts in the various figures. The embodiments herein will be better understood from the following description with reference to the drawings, in which.

DETAILED DESCRIPTION

Figure 1:
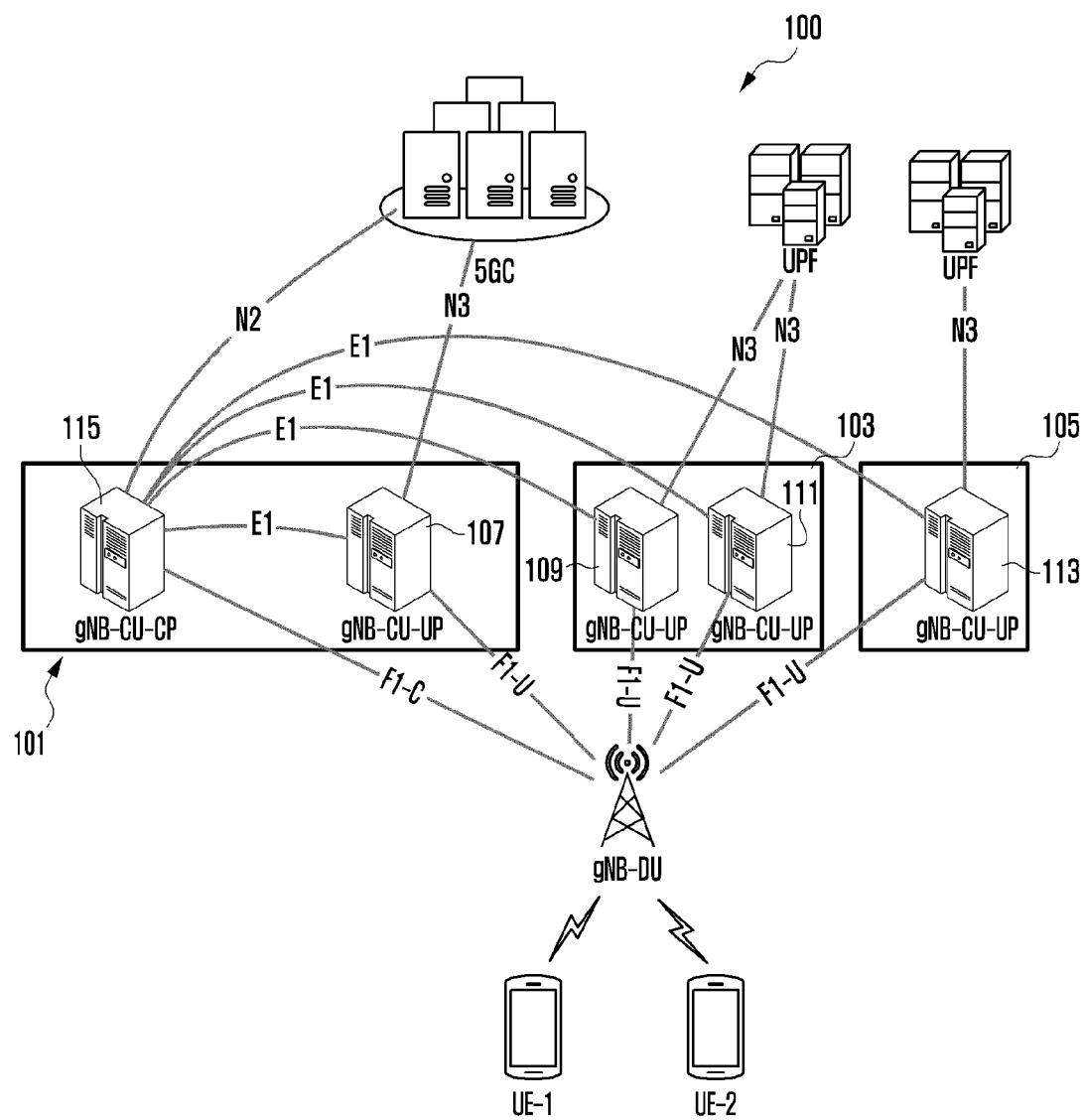
FIG. 1 depicts an example topology of a 5$^{th}$ Generation (5G) Radio Access Network (RAN), wherein there is support provided for multiple Centralized Unit-User Planes (CU-UPs)
Figure 2:
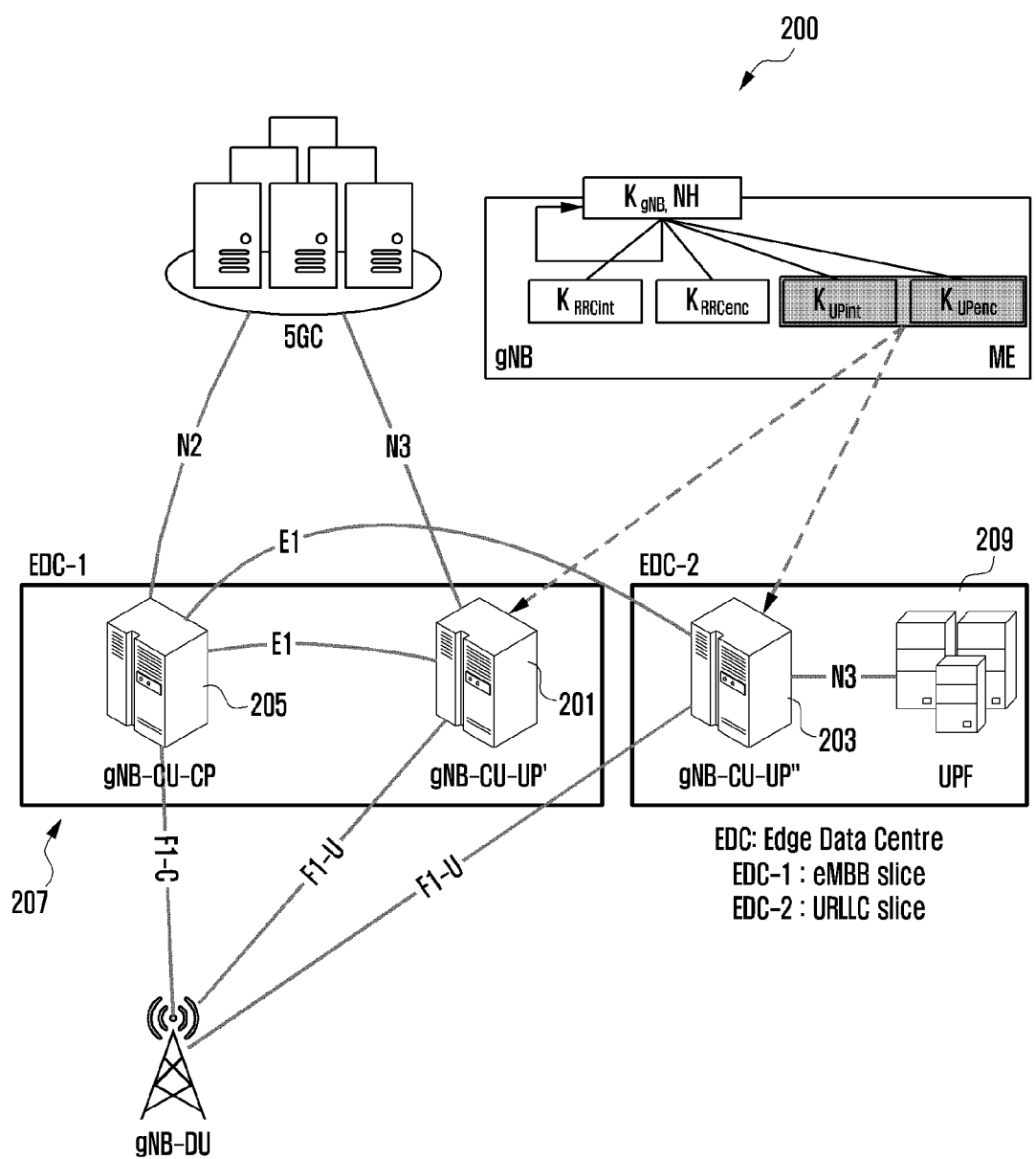
FIG. 2 depicts an example topology of a 5G-RAN wherein data security vulnerabilities are introduced at CU-UPs due to use of a common security key at all the CU-UPs.
Figure 3A:
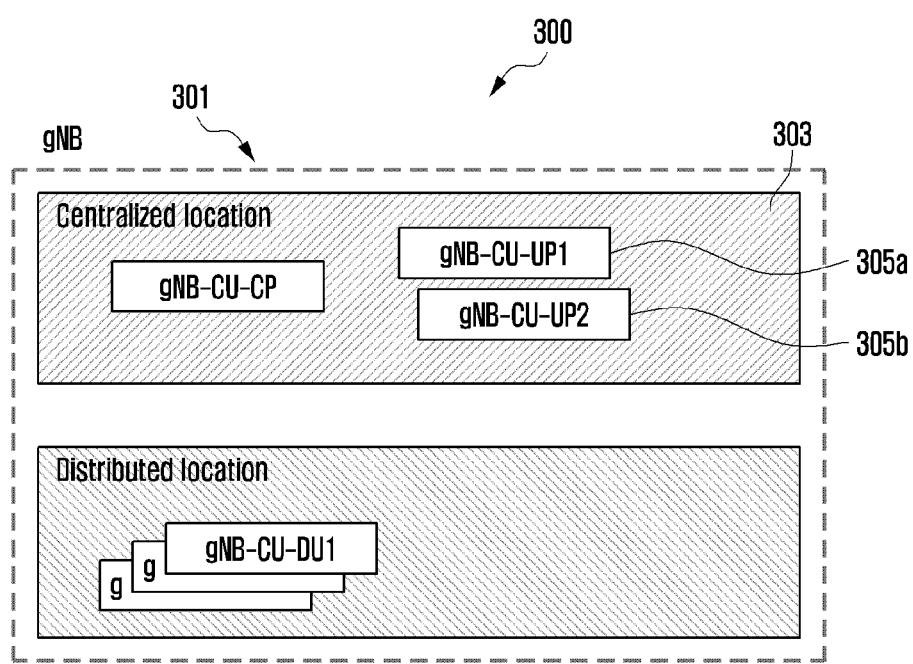
FIG. 3a depicts an example scenario, wherein CU-UPs of a Next generation Node B (gNB) are present in the same centralized location (CU)
Figure 3B:
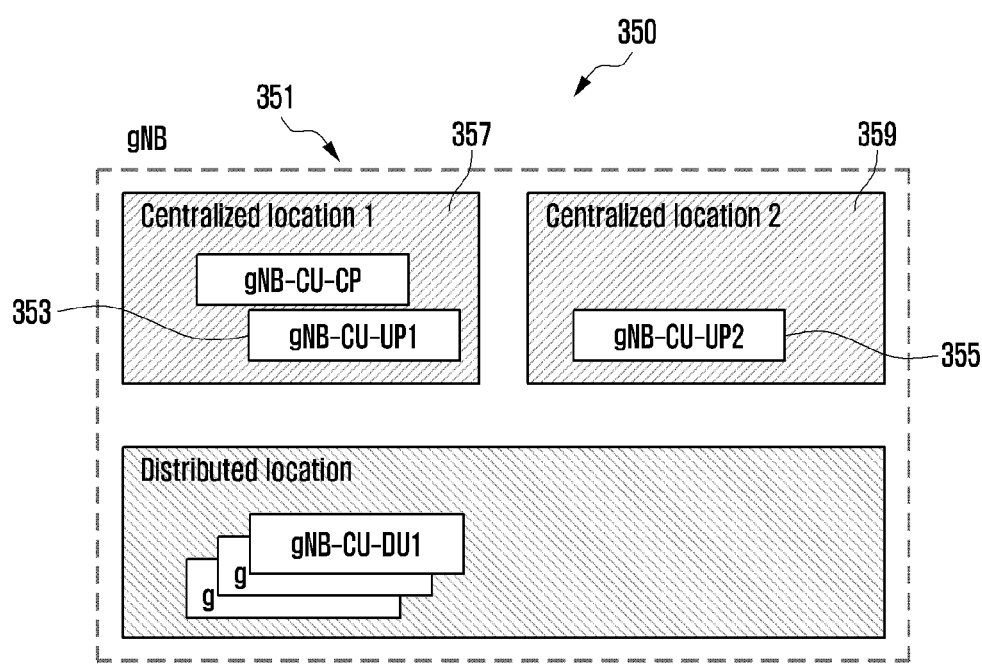
FIG. 3b depicts an example scenario, wherein the CU-UPs of the gNB are present in different locations of a CU.
Figure 3C:
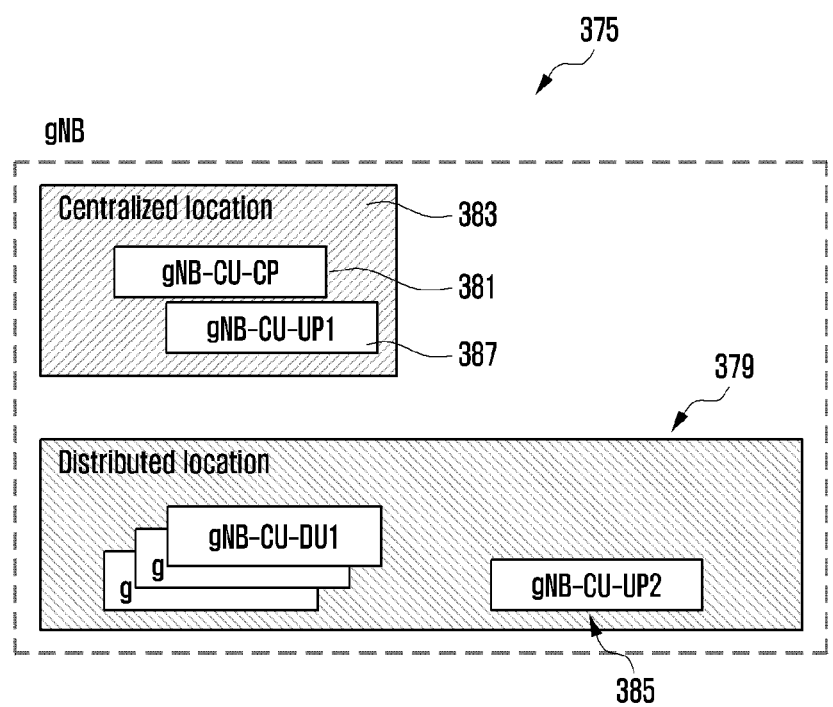
FIG. 3c depicts an example scenario, wherein a CU-UP of a gNB is present in a distributed location (DU), and another CU-CP of the gNB is present in a centralized location (CU)

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for generating Centralized Unit-User Plane (CU-UP) security keys for a disaggregated Next Generation Node B (gNB) architecture. A User Equipment (UE) can indicate a gNB about UE support for generating CU-UP security keys. Similarly, the gNB can indicate the UE about gNB support for generating CU-UP security keys. The UE/gNB can inform the gNB/UE, using the indications, about the capability of the UE/gNB to derive CU-UP security keys. The CU-UP security keys comprise an integrity protection key and a ciphering key. The gNB can derive, at least one integrity protection key and at least one ciphering key for each Data Radio Bearer (DRB), upon determining that the UE supports derivation of the CU-UP security keys (UE has capability to derive CU-UP security keys). The at least one integrity protection key protects the integrity of data, in at least one DRB, traversing through at least one CU-UP. The at least one ciphering key encrypts the data, in at least one DRB, traversing through the at least one CU-UP.

In at least one embodiment, the gNB can send Radio Resource Control (RRC) connection reconfiguration messages to the UE, to indicate to the UE activation of CU-UP security. The RRC connection reconfiguration messages may include a plurality of parameters. The plurality of parameters can enable the UE to derive at least one integrity protection key and at least one ciphering key, for each DRB. The UE verifies the RRC connection reconfiguration messages received from the gNB. If the verification is successful, the UE can determine whether CU-UP security is activated. If the UE determines that the CU-UP security is activated, the UE can extract the plurality of parameters. The UE can derive at least one integrity protection key and at least one ciphering key, for at least one DRB, based on the plurality of parameters, for protecting the integrity of the data and encrypting the data, in at least one DRB, traversing through the at least one CU-UP.

Referring now to the drawings, and more particularly to the illustrative examples of FIGS. 4 through 8, where similar reference characters denote corresponding features consistently throughout the figures, there are shown preferred embodiments.

Figure 4:
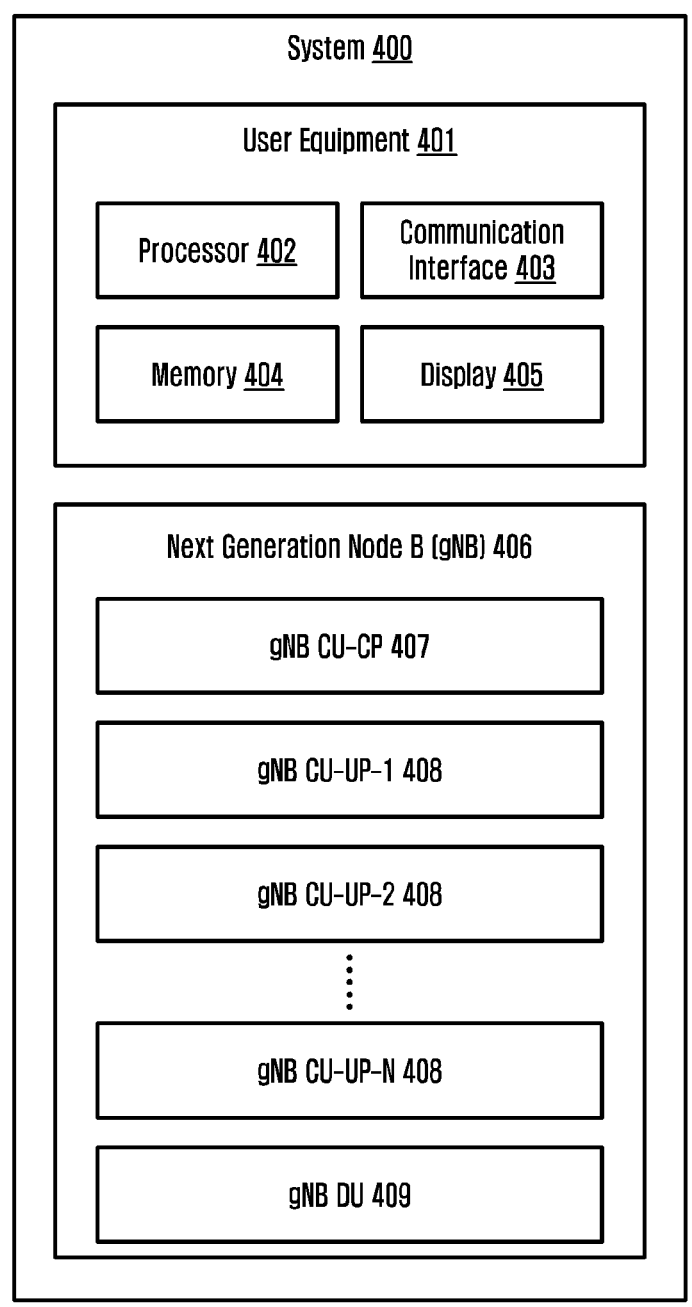
FIG. 4 illustrates, in block diagram format, an example system configured to derive CU-UP security keys for disaggregated gNB architecture, according to certain embodiments as disclosed herein.

FIG. 4 illustrates an example system 400 configured to derive CU-UP security keys for disaggregated gNB architecture, according to embodiments as disclosed herein. According to the illustrative example of FIG. 4, system 400 comprises a UE 401 and a gNB 406. The gNB 406 comprises a gNB CU-CP 407, a plurality of gNB CU-UPs-(1-N) 408, and a gNB DU 409. The UE 401 can include a processor 402, a communication interface 403, a memory 404, and a display 405. As depicted in FIG. 4, the gNB 406 has a disaggregated architecture. The gNB 406 can be connected to a 5$^{th}$ Generation (5G) core network (not shown), a 4$^{th}$ Generation (4G) core network (not shown), or other Radio Access Technologies (RATs).

The number of gNB CU-UPs-(1-N) 408, arrangement of the plurality of gNB CU-UPs-(1-N) 408 and the gNB DU 409, locations of each of the plurality of CU-UPs-(1-N) 408 and the gNB DU 409, entities in which each of the plurality of CU-UPs-(1-N) 408 and the gNB DU 409 are located, security domains employed at the entities, and so on, comprise a Radio Access Network (RAN) topology, which can be configured according to the application and network requirements. The UE 401 can interact with the 4G/5G core network, of the plurality of CU-UPs-(1-N) 408 and the gNB DU 409 through the communication interface 403. The UE 401 can store commands, control plane and data plane messages, necessary or relevant for the generation of CU-CP security keys, in the memory 404.

In certain embodiments, the UE 401 can be configured to generate unique cryptographic CU-UP security keys. As the gNB 406 has disaggregated gNB architecture, the uniqueness can refer to the generation of a plurality of security keys, corresponding to each of the plurality of gNB CU-UPs-(1-N) 408. The plurality of CU-UP security keys can be generated for each Data Radio Bearer (DRB) of each Protocol Data Unit (PDU) session. The generation of CU-UP security keys for each DRB of each PDU session can ensure that the RAN topology is concealed. The use of same security keys at each of the plurality of gNB CU-UPs 408 can be avoided by using a plurality of parameters for generating the unique CU-CP security keys. In an embodiment, the plurality of parameters include, but are not limited to, Quality of service Flow Identifier (QFI) (pertaining to data flow), PDU Session ID, DRB ID, and so on.

In various embodiments, the plurality of parameters can be considered as input parameters for a Key Derivation Function (KDF). The KDF can be utilized by the processor 402 to generate the CU-CP security keys, which are unique to each of the plurality of gNB CU-UPs-(1-N) 408. The KDF can utilize a plurality of independent variables along with the plurality of input parameters to generate at least one of an integrity protection key ($K_{UPint}$) and a ciphering key ($K_{UPenc}$), which pertains to each of the plurality of gNB CU-UPs-(1-N) 408. The independent variables include encryption mechanism (such as SNOW 3G or AES-CTR) type distinguishers or integrity protection mechanism (such as SNOW 3G or AES-CMAC) type distinguishers, encryption mechanism identity or integrity protection mechanism identity, Access Stratum (AS) root key or gNB key ($K_{gNB}$). In certain embodiments, the CU-UP security keys comprise an integrity protection key ($K_{UPint}$) and the ciphering (or encryption) key ($K_{UPenc}$), which can be generated independently for each of the plurality of gNB CU-UPs-(1-N) 408.

If the gNB 406 is connected to the 5G core network (standalone architecture), the gNB 406 may operate as a RAN node or Master Node (MN). In various embodiments, the processor 402 can derive the CU-UP security keys pertaining to each gNB CU-UP-(1-N) 408 based on the following:

$K_{UPint}/K_{UPenc}$ (CU-UP security keys)=KDF ($K_{gNB}/K_{NG-RAN}^*$, encryption mechanism type distinguishers or integrity protection mechanism type distinguishers, encryption mechanism identity or integrity protection mechanism identity, PDU session ID, QoS Flow ID(s) (QFIs), DRB ID, and other possible parameters). Each derivation of $K_{UPint}$ and $K_{UPenc}$ uniquely pertains to a DRB. The encryption mechanism type distinguishers or the integrity protection mechanism type distinguishers and the encryption mechanism or integrity protection mechanism (which will use the generated key) identity are as specified in the 3GPP specification.

In a standalone architecture, UE 401 and gNB 406 can generate the CU-UP security keys ($K_{UPint}/K_{UPenc}$) for each DRB, based on at least one of an Access Stratum (AS) security key ($K_{gNB}$), encryption mechanism type distinguishers or integrity protection mechanism type distinguishers, encryption mechanism identity or integrity protection mechanism identity, PDU session ID, QFIs, and DRB ID.

If a plurality of QFIs corresponding to UL (uplink) QoS flows of a PDU session are mapped to a DRB (DRB ID), then a list comprising the plurality of QFIs mapped to the DRB may provide an input parameter for derivation of the CU-CP security keys. It can be noted that the utilization of QFI as an input parameter for derivation of the CU-CP security keys can increase the uniqueness property of the generated CU-CP security keys, as it is unlikely that the QFI of a QoS flow of a PDU session can be assigned to two or more gNB CU-UPs 408. Therefore, use of a combination of the input parameters, such as the PDU Session ID, DRB ID and the QFI(s), can allow for generation of cryptographically isolated CU-UP security keys (unique security keys) for the disaggregated gNB architecture.

The use of PDU Session ID as an input parameter can ensure uniqueness amongst the PDU sessions ongoing between the UE 401 and the gNB 406. The use of DRB ID as an input parameter ensures uniqueness amongst the DRBs within a PDU session. The use of QFI as an input parameter avoids repeated derivation of the same key, as a DRB ID can be repeated within a PDU session.

In various embodiments, the generated CU-UP keys ($K_{UPint}$ or $K_{UPenc}$) can be utilized by a Packet Data Convergence Protocol (PDCP) entity, which is established/created/configured for each radio bearer (DRB ID) for protecting the integrity of data or encrypting the data generated by the UE 401 and the gNB 406, and the data traversing through the gNB CU-UPs-(1-N) 408.

A PDCP entity can perform PDCP functions configured either at transmitting side or receiving side (UE 401 or gNB 406), Each Radio Bearer (RB) (DRB and Signaling RB (SRB), except for SRB-0) is associated with a PDCP entity. Each PDCP entity is associated either with CP or UP, depending on the RB on which data is transmitted. Each PDCP entity is associated with one or two (one for each direction) Radio Link Control (RLC) entities based on an RB characteristic (unidirectional or bidirectional) and a RLC mode. The PDCP entities are located in the PDCP sub-layer. The PDCP entity performs header compression, security functions, handover support functions and maintenance of PDCP sequence numbers for SRB and DRB. As used in this disclosure, generating and configuring of at least one integrity protection key and at least one ciphering key for each DRB refers to generating and configuring of ciphering or integrity protection key(s) for each PDCP entities/instances associated with a DRB (Transmitting PDCP instance or Receiving PDCP instance of the CU-UPs-(1-N) 408 or corresponding Receiving PDCP instance and Transmitting PDCP instance of the FE 401).

In Multi-Radio access technology Dual Connectivity (MR-DC) systems, if the gNB 406 is connected to the 5G core network, the gNB 406 can be considered as MN or Secondary Node (SN). In an embodiment, the processor 402 can derive the CU-UP security keys pertaining to each gNB CU-UP-(1-N) 408 based on the following: $K_{UPint}/K_{UPenc}$=KDF ($K_{SN}$, encryption mechanism type distinguishers or integrity protection mechanism type distinguishers, encryption mechanism identity or integrity protection mechanism identity, PDU session ID, QFIs, DRB ID, and other possible parameters). Each derivation of $K_{UPint}$ and $K_{UPenc}$ uniquely pertains to a DRB.

In MR-DC systems, if the gNB 406 is connected to the 4G network, and the gNB is a SN, the processor 402 can derive the CU-UP security keys pertaining to each gNB CU-UP-(1-N) 408 based on the following: $K_{UPint}/K_{UPenc}$=KDF ($K_{S-gNB}/K_{SN}$, encryption mechanism type distinguishers or integrity protection mechanism type distinguishers, encryption mechanism identity or integrity protection mechanism identity, PDU session ID, QFIs, DRB ID, and other possible parameters). Each derivation of $K_{UPint}$ and $K_{UPenc}$ uniquely pertains to a DRB.

In an embodiment, the processor 402 can derive the CU-CP security keys based on values indicated in a counter. The processor 402 can receive counter values pertaining to individual DRBs (DRB IDs). The counter values can be referred to as Counter-DgA (Disaggregated gNB Architecture). The gNB CU-CP 407 can maintain a 16-bit counter, i.e., Counter-DgA, in an AS security context in the gNB CU-CP 407. The processor 402 can utilize the Counter-DgA value during the computation of the CU-UP security keys ($K_{UPint}/K_{UPenc}$). The gNB CU-CP 407 can maintain the value of the counter (Counter-DgA) for duration of the current 5G AS security context between the UE 401 and gNB 406 (gNB CU-CP 407).

In various embodiments, the UE 401 does not maintain the Counter-DgA after the computation of the CU-UP security keys ($K_{UPint}/K_{UPenc}$) by the UE 401 (processor 402), since the gNB 406 (gNB CU-CP 407) provides the UE 401 with the current Counter-DgA value when the UE 401 needs to compute a new CU-UP security key. The UE 401 can consider the Counter-DgA to be a fresh input (to be used for derivation of CU-UP security key ($K_{UPint}/K_{UPenc}$)) when the UE 401 receives the Counter-DgA from the gNB CU-CP 407 and, therefore, does not verify the Counter-DgA.

In various embodiments, the gNB 406 (gNB CU-CP 407) can initialize the Counter-DgA to '0' when a new AS root key, $K_{gNB}$, in the associated 5G AS security context is established. The gNB 406 (gNB CU-CP 407) sets the Counter-DgA to '1' after a first instance of computation of CU-UP security keys ($K_{UPint}/K_{UPenc}$). The gNB CU-CP 407 can monotonically increment the Counter-DgA each time a CU-UP security key ($K_{UPint}/K_{UPenc}$) is computed. If the gNB 406 (gNB CU-CP 407) releases an established PDU session with a gNB CU-UP-(1-N) 408, and later intends to restart or reestablish the PDU session with the same/different gNB CU-UP-(1-N) 408, the gNB CU-CP 407 can maintain and increment the Counter-DgA. This can ensure that the computed CU-UP security keys ($K_{UPint}/K_{UPenc}$) are unique.

The gNB 406 (gNB CU-CP 407) can refresh the root key of the 5G AS security context associated with the Counter-DgA prior to wrap around of the Counter-DgA. The refreshing of the root key can be achieved during intra-cell handover. When the root key is refreshed, the Counter-DgA is reset to '0'.

In certain embodiments, the Counter-DgA considered for derivation of $K_{UPint}$ is same as the Counter-DgA considered for derivation of $K_{UPenc}$, for each DRB. The UE 401 (processor 401) can derive $K_{UPint}$ for integrity protection and derive $K_{UPenc}$ for ciphering, if both CP-UP integrity protection and ciphering are activated for a DRB. The processor 402 can utilize the same Counter-DgA for derivation for derivation of $K_{UPint}$ and $K_{UPenc}$.

In various embodiments, if addition of a DRB using RRC connection reconfiguration procedure leads to the activation of multiple DRBs, the gNB CU-CP 407 can provide a dedicated Counter-DgA for each DRB ID to the UE 401. Therefore, CU-UP security keys ($K_{UPint}/K_{UPenc}$) can be derived for each DRB using the associated unique Counter-DgA. The DRB addition or modification procedure includes a Counter-DgA for a DRB ID, to allow the UE 401 (processor 402) to derive the CU-UP security keys using the corresponding Counter-DgA value for the DRB ID. In an embodiment, the processor 402 can derive the CU-UP security keys pertaining to each gNB CU-UP-(1-N) 408 based on one or more of the following: $K_{UPint}/K_{UPenc}$=KDF ($K_{gNB}$, Counter-DgA, encryption mechanism type distinguishers or integrity protection mechanism type distinguishers, encryption mechanism identity or integrity protection mechanism identity, other possible parameters). Each derivation of $K_{UPint}$ and $K_{UPenc}$ uniquely pertains to a DRB. The other possible parameters include the PDU session ID, QFI, and DRB ID.

When the UE 401 undergoes a handover from the (source) gNB 406 to another (target) gNB or from one gNB CU-CP 407 to another gNB CU-CP, the serving gNB CU-UP-(1-N) 408 is likely to change. Based on the target gNB and the capability of the UE 401 to derive CU-UP security keys, the source gNB 406 can send a HANDOVER Command message (or any other RRC message) to the UE 401 for indicating that unique CU-UP security keys need to be generated for each CU-UP of the target gNB. The HANDOVER Command message can include information required for CU-UP security key derivation for disaggregated gNB architecture. If both UE 401 and the target gNB 406 supports derivation of unique CU-UP security keys for disaggregated gNB architecture, then the UE 401 and the target gNB 406 can derive CU-UP security keys and configures PDCP instances accordingly.

In certain embodiments, if the UE 401 undergoes a handover, from a gNB, with multiple CU-UPs, supporting derivation of unique CU-UP security keys for each gNB-CU-UP, to a gNB with a single gNB CU-UPs, and if the UE 401 and the target gNB support CU-UP security key derivation for disaggregated gNB architecture, the UE 401 and the target gNB can derive CU-UP security keys as described, and configure PDCP instances accordingly.

FIG. 4 shows exemplary units of the system 400, but it is to be understood that other embodiments are not limited thereon. In other embodiments, the system 400 may include less or more number of units. Further, the labels or names of the units of the system 400 are used only for illustrative purpose and does not limit the scope of the invention. One or more units can be combined together to perform same or substantially similar function in the system 400.

Figure 5:
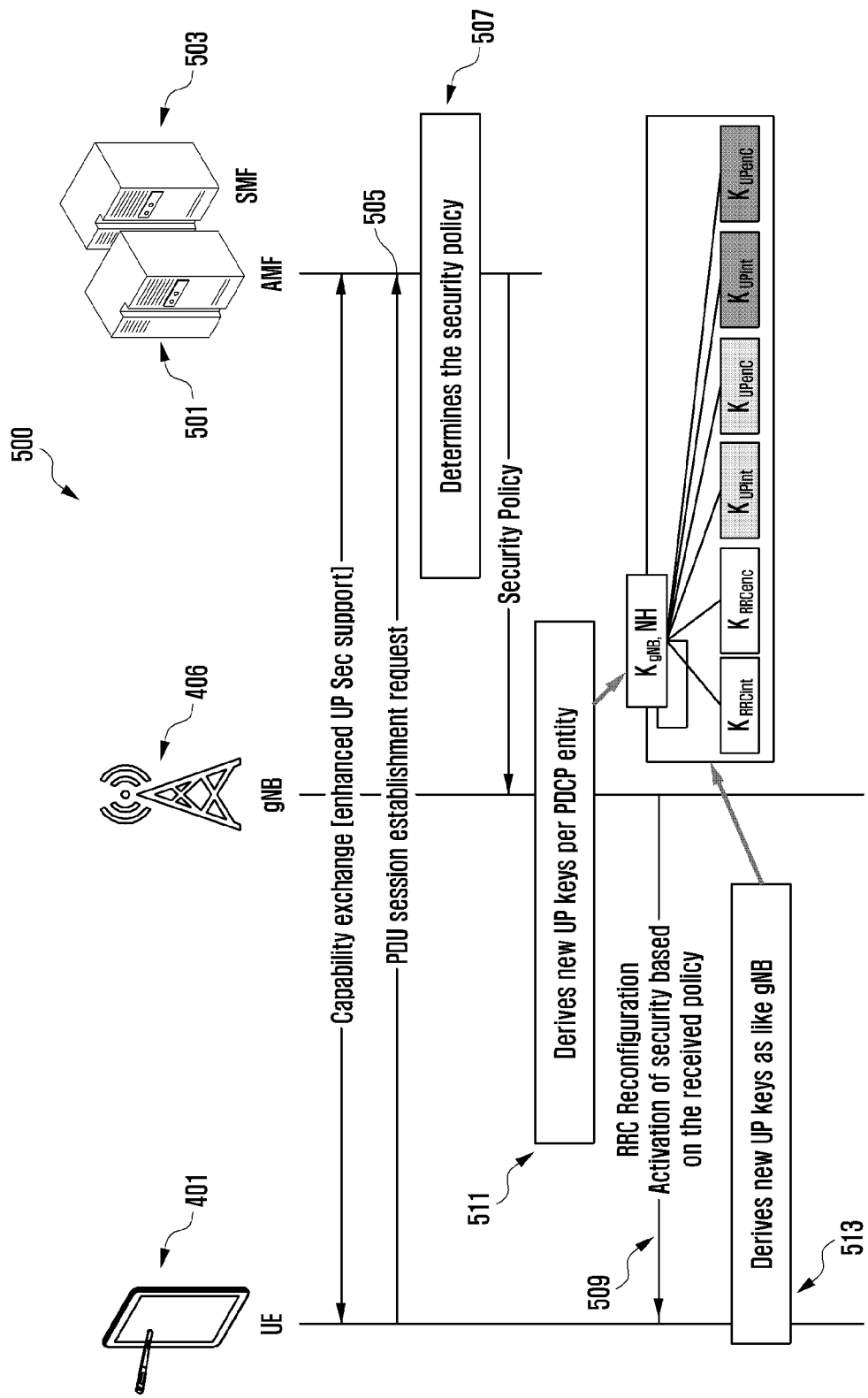
FIG. 5 is a sequence diagram illustrating an example of an exchange of messages between a UE, a gNB, and a 5G core network, for generating cryptographically isolated CU-UP security keys for the disaggregated gNB architecture, according to various embodiments as disclosed herein.

FIG. 5 is a sequence diagram depicting an exchange of messages 500 between the UE 401, the gNB 406, and the 5G core network for generating cryptographically isolated CU-UP security keys for the disaggregated gNB architecture, according to embodiments as disclosed herein. As depicted in FIG. 5, the 5G core network comprises an Access and Mobility Function (AMF) 501 and a Session Management Function (SMF) 503. In certain embodiments, initially, the UE 401 may inform the gNB 406 about the capability of the UE 401 to generate the CU-UP security keys, and the gNB 406 may inform the UE 401 about the capability of the gNB 406 to generate the CU-UP security keys. If the UE 401 and the gNB 406 support CU-UP key derivation for disaggregated gNB architecture as a mandatory feature, a mutual exchange of explicit indications as to the capabilities of the UE 401 and the gNB 406 to generate CU-UP security keys, between the UE 401 and the gNB 406 may be omitted.

In various embodiments, UE 401 can indicate to gNB 406 the capability of the UE 401 to generate CU-UP security keys through a parameter provided in an access stratum release. The gNB 406 can determine the capability of the UE 401 by checking the Information Element (IE) "accessStratumRelease". In another embodiment, the UE 401 can provide the indication to the gNB 406 of support for CU-UP security key derivation for disaggregated gNB architecture in an explicit parameter exchanged during AS procedure or Non-AS (NAS) procedure. The AS procedure or NAS procedure during which the explicit parameter is exchanged is either a PDU establishment procedure (The UE 401 can include the indication of the capability to generate CU-UP security keys in a PDU Session Establishment Request. The AMF can provide the indication to the gNB 406 in a N-2 PDU Session Request), an SMC procedure (The UE 401 can include the indication in AS Security Mode Complete message), or a Registration procedure (The UE 401 can include the indication in the Registration Request message, either as part of an AN parameter, part of UE 401 Radio Capability Update, or an independent new parameter).

In certain embodiments, the gNB 406 indicates its capability of CU-UP security key derivation for disaggregated gNB architecture to the UE 401 in the AS procedure or NAS procedure. The AS procedure or NAS procedure during which the capability of the gNB 406 is exchanged is either: a Registration procedure (the gNB 406 sends the indication to the UE 401 in Registration accept message), a PDU session establishment procedure (the gNB 406 sends the indication to the UE 401 in a RRC Connection Reconfiguration Message), an SMC procedure (the gNB 406 sends the indication to the UE 401 in an AS Security Mode Command message), or in a System Information Block (SIB) broadcast.

Thereafter, the UE 401 can send a PDU session establishment request 505. The CU-UP security keys, i.e., the integrity protection key ($K_{UPint}$) and the ciphering key ($K_{UPenc}$), can be derived during the addition of DRBs. The addition of DRBs can be performed after the activation of RRC security. If RRC security is activated, the SMF can send CU-UP security policy to the gNB 406 during PDU session establishment procedure. Once the gNB 406 receives the security policy, at block 507, the gNB 406 can determine whether CU-UP security is activated. According to some embodiments, at block 511, if the CU-UP is activated, the gNB 406 can generate at least one integrity protection key and at least one ciphering key, for each DRB, based on the plurality of parameters relevant to each DRB. The plurality of parameters include gNB key (AS root key), a PDU session ID, a DRB ID, and at least one QFI mapped to the DRB ID.

Once the gNB 406 has generated the CU-UP security keys, the gNB 406 can send a RRC connection reconfiguration message 509 to the UE 401. The gNB 406 can include the plurality of parameters, pertaining to each DRB (i.e., for each DRB of the PDU session), in the RRC connection reconfiguration message. The UE 401 verifies the RRC connection reconfiguration message received from the gNB 406. If the verification is successful, the UE 401 can determine whether CU-UP security is activated. If the CU-UP security is activated, the UE can extract the plurality of parameters. At block 513, UE 401 can derive at least one integrity protection key and at least one ciphering key, for each DRB, based on the plurality of parameters, for protecting the integrity of the data and encrypting the data, in each DRB, traversing through the at least one CU-UP. The UE 401 can utilize the KDFs to generate CU-UP security keys.

Figure 6:
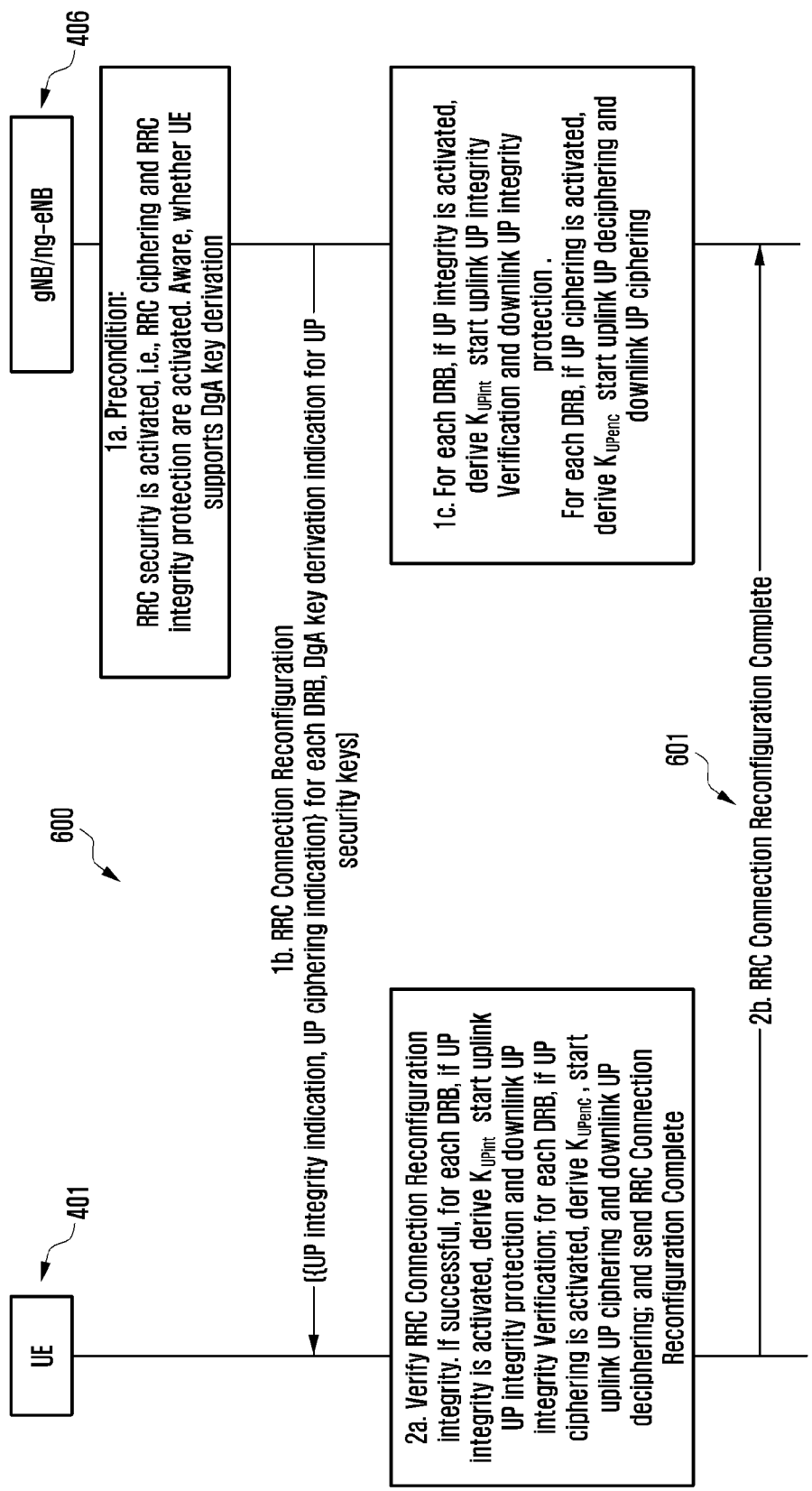
FIG. 6 is a sequence diagram illustrating an example of a mechanism for CU-UP security activation, which involves exchange of messages between the UE and the gNB, for informing support for CU-UP security and transfer of parameters for enabling generation of CU-UP security keys, according to some embodiments as disclosed herein.

FIG. 6 is a sequence diagram illustrating an example of a mechanism for CU-UP security activation, which involves exchange of messages 600 between the UE 401 and the gNB 406 for informing support for CU-UP security and transfer of parameters for enabling generation of CU-UP security keys, according to some embodiments as disclosed herein.

Referring to the illustrative example of FIG. 6, at Step 1*a*, the activation of CU-UP security through AS procedure can be performed as part of DRB addition during the RRC Connection Reconfiguration procedure (as defined in the 3GPP specification). This involves generating the CU-UP security keys, i.e., the integrity protection key ($K_{UPint}$) and the ciphering key ($K_{UPenc}$), which are meant for protecting the integrity of data traversing through the gNB CU-UPs-(1-N) 408 and encrypting the data traversing through the gNB CU-UPs-(1-N) 408 respectively.

If gNB 406 is connected to a 5G core network, the SMF can send the CU-UP security policy to gNB 406 (as defined in 3GPP specifications). The RRC Connection Reconfiguration procedure, which is utilized for adding DRBs, can be performed after the activation of RRC security. The activation of RRC security is a part of AS security mode command procedure. At this instance, it can be considered that the gNB 406 is aware of whether the UE 401 supports CU-UP key derivation for disaggregated gNB architecture.

According to various embodiments, at step 1*b*, the gNB 406 (next generation evolved Node B (ng-eNB)) sends the RRC Connection Reconfiguration message to the UE 401 as a part of the RRC Connection Reconfiguration procedure. The RRC Connection Reconfiguration message may include indications that allow the UE 401 to determine whether CU-UP security is activated. The activation or deactivation of CU-UP security can indicate to the UE 401 whether the UE 401 needs to generate the CU-UP security keys, i.e., the integrity protection key ($K_{UPint}$) (for protecting the integrity of data traversing through the gNB CU-UPs-(1-N) 408 and the ciphering key ($K_{UPenc}$) (for encrypting the data traversing through the gNB CU-UPs-(1-N) 408).

According to some embodiments, the integrity protection key ($K_{UPint}$) and the ciphering key ($K_{UPenc}$) can be generated for each DRB based on the security policy. Consider that the RRC Connection Reconfiguration message includes indications that request the UE 401 to derive (generate) CU-UP security keys for disaggregated gNB architecture. In an embodiment, the RRC Connection Reconfiguration message from the gNB 406, received by the UE 401, includes parameters such as PDU session ID(s), DRB ID(s), mapping QFI(s) (each DRB ID can map to one or more QFIs), and so on. The UE 401 can derive (generate) the CU-UP security keys ($K_{UPint}$ or $K_{UPenc}$) based on the parameters. In various embodiments, if Counter-DgA (value of 16 bit counter maintained at the gNB 406) is used for deriving (generating) CU-UP security keys ($K_{UPint}$ or $K_{UPenc}$), then the Counter-DgA value pertaining to each DRB is included in the RRC Connection Reconfiguration message.

Referring to the explanatory example of FIG. 6, at step 1*c*, if it is indicated in the RRC Connection Reconfiguration message that CU-UP security is activated for each DRB (CU-UP security keys, viz., integrity protection key $K_{UPint}$ or ciphering key $K_{UPenc}$, needs to be derived for each DRB) and if the gNB 406 has not generated $K_{UPint}$ or $K_{UPenc}$, the gNB 406 can generate $K_{UPint}$ or $K_{UPenc}$. It is to be noted that, in this explanatory example, the gNB 406 generates $K_{UPint}$ or $K_{UPenc}$ on determining that the UE 401 supports generation of CU-UP security keys for disaggregated gNB architecture. The process of generating $K_{UPint}$ and $K_{UPenc}$, by the gNB 406, is, in some embodiments, identical to the process used by the UE 401 to generate $K_{UPint}$ and $K_{UPenc}$.

If CU-UP security is not activated, i.e., derivation of integrity protection key is not activated for the DRBs, and the gNB 406 may not protect the integrity of the traffic (data) traversing through the plurality of CU-UPs-(1-N) 408 in the DRBs. The gNB 406 may not include a Message Authentication Code MAC-I in PDCP packets. Similarly, where derivation of a ciphering key is not activated for the DRBs, the gNB 406 may not cipher the traffic (data) traversing through the plurality of CU-UPs-(1-N) 408 in the DRBs.

As shown in FIG. 6, at step 2*a*, once the UE 401 receives the RRC Connection Reconfiguration message from the gNB 406, the UE 401 can verify the RRC Connection Reconfiguration message. If the verification is successful, the UE 401 can determine whether CU-UP security is activated. If the UE 401 determines that the RRC Connection Reconfiguration message indicates CU-UP security is activated for each DRB, the UE 401 can derive the CU-UP security keys, for example, an integrity protection key $K_{UPint}$ or a ciphering key $K_{UPenc}$ (provided the UE 401 supports CU-UP security key derivation for disaggregated gNB architecture).

If CU-UP security is not activated, such as when derivation of integrity protection key is not activated for the DRBs, the UE 401 may not protect the integrity of the traffic (data) traversing through the plurality of CU-UPs-(1-N) 408 in the DRBs. The UE 401 may not include a Message Authentication Code MAC-I in PDCP packets. Similarly, if derivation of ciphering key is not activated for the DRBs, the UE 401 may not cipher the traffic (data) traversing through the plurality of CU-UPs-(1-N) 408 in the DRBs.

As shown in FIG. 6, at step 2*b*, if the UE 401 successfully verifies the integrity of the RRC Connection Reconfiguration message, the UE 401 can send a RRC Connection Reconfiguration Complete message 601 to the gNB (ng-eNB) 406.

If the UE 401 and the gNB 406 support derivation of CU-UP security keys for disaggregated gNB architecture, then the gNB CU-CP 407 provides the generated CU-UP security keys to the plurality of gNB CU-UPs-(1-N) 408 over dedicated E1 interfaces (connecting the gNB CU-CP 407 with each of the plurality of gNB CU-UPs-(1-N) 408) using Bearer Context Management procedure. In an embodiment, the generated CU-UP security keys are sent to the plurality of gNB CU-UPs-(1-N) 408 in a BEARER CONTEXT SETUP REQUEST message using Security Information IE during the Bearer Context Setup procedure.

Figure 7:
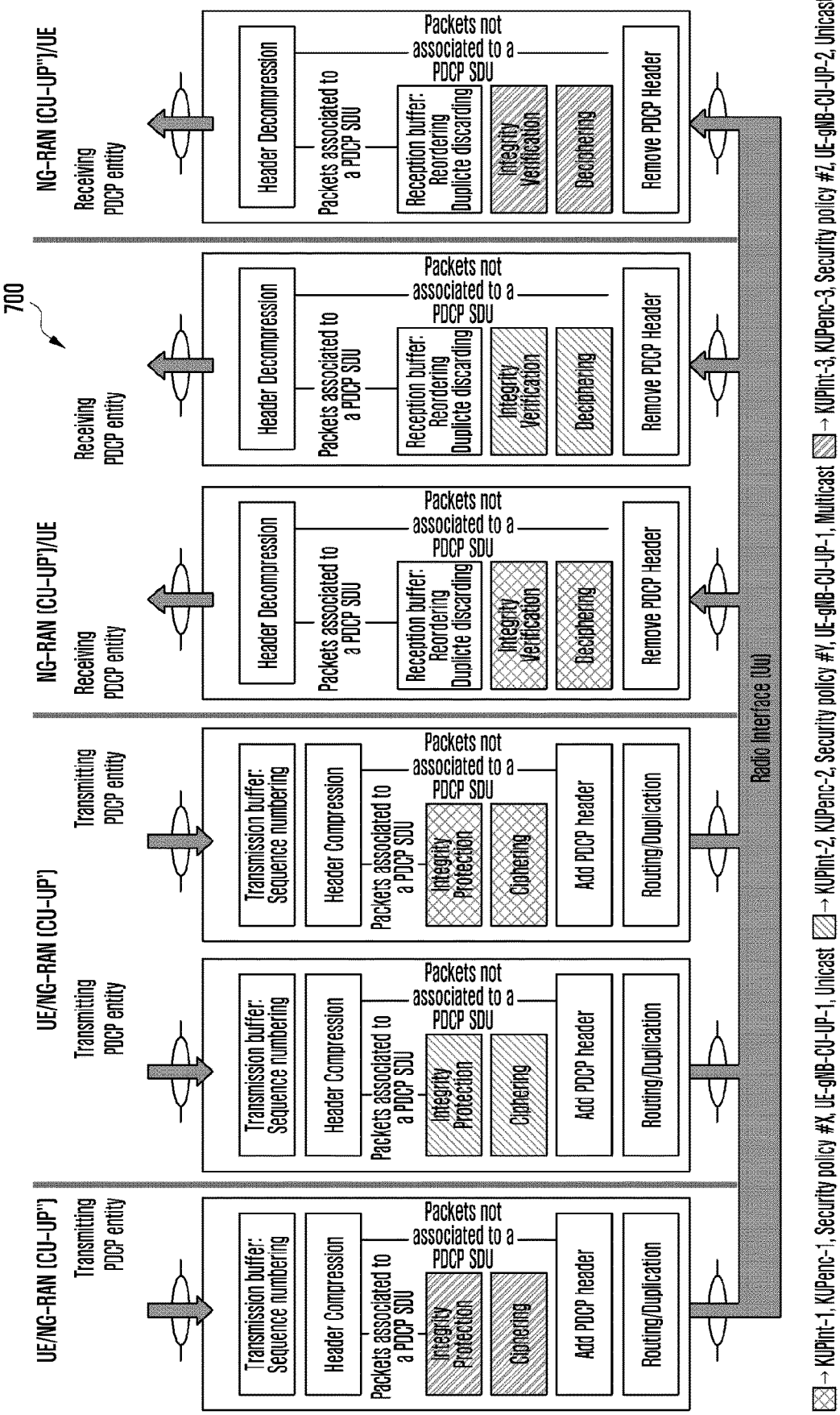
FIG. 7 illustrates an example of handling of cryptographically isolated CU-UP security keys for disaggregated gNB architecture, according to certain embodiments as disclosed herein.

FIG. 7 depicts an example of handling of cryptographically isolated CU-UP security keys for disaggregated gNB architecture, according to various embodiments as disclosed herein. As illustrates in the example of FIG. 7, a network architecture 700 may include two CU-UPs, for example, CU-UP' and CU-UP". Certain embodiments generate UP security keys, including integrity protection key $K_{UPint}$ or ciphering key $K_{UPenc}$, pertaining to each DRB, in the CU-UP' the CU-UP", and in the UE. The generation of UP security keys is based on the security policy. As depicted in FIG. 7, for each DRB, separate UP security keys for unicast and multicast transmissions are generated. The integrity protection key $K_{UPint}$ or ciphering key $K_{UPenc}$ are separately generated for each DRB (PDCP entity) for protecting the integrity of data and encrypting the data in each DRB (PDCP entity). The three transmitting PDCP entities at the CU-UP side (CU-UP' and CU-UP") utilize separate security keys ($K_{UPint}$ or $K_{UPenc}$). The UE (for example, 401) generates separate security keys ($K_{UPint}$ or $K_{UPenc}$) and utilizes the separate security keys for each of the receiving PDCP entities. The three pairs of PDCP entities shown in FIG. 7 (transmitting and receiving) are associated with three different DRBs.

Figure 8:
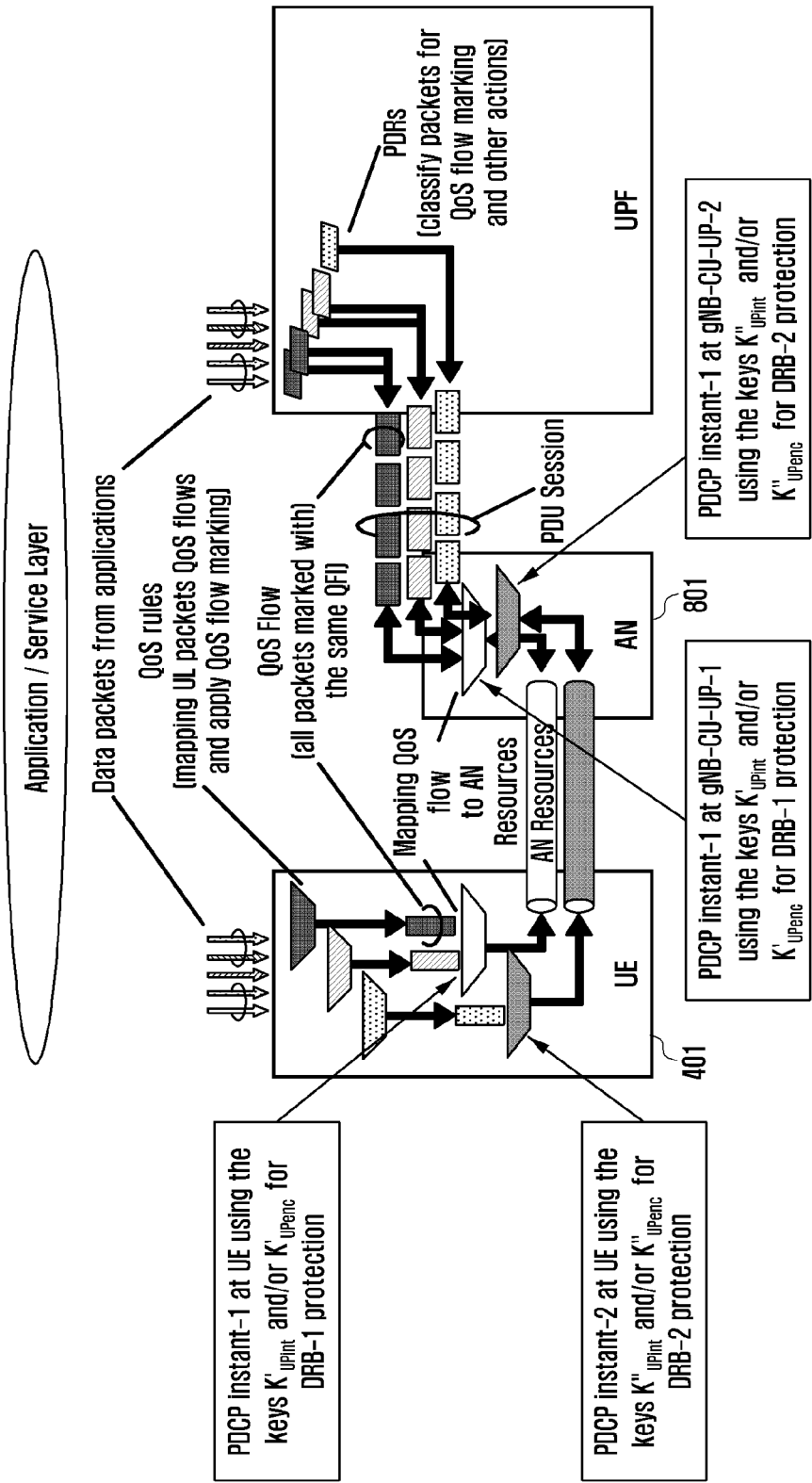
FIG. 8 illustrates an example of generation of cryptographically isolated CU-UP security keys and its use in a 5G system, according to various embodiments as disclosed herein.

FIG. 8 depicts an example of generation of cryptographically isolated CU-UP security keys and their use in a 5G system, according to various embodiments as disclosed herein. Certain embodiments according to this disclosure generate CU-UP security keys based on a plurality of parameters, the parameters comprising PDU session ID, DRB ID and QFIs. The generated CU-UP security keys are cryptographically isolated, which implies that embodiments can generate at least one CU-UP security key for each DRB.

As illustrated in FIG. 8, the gNB 406 comprises part of an Access Network (AN) 801. The UE 401 can include applications which generate data packets. Based on QoS policy, the data packets pertaining to different applications can be mapped to different QoS flows and QoS flow marking can be applied. In some embodiments, the packets in a QoS flow can be marked using a QFI.

In various embodiments, the QoS flows can be mapped to resources of AN 801 (gNB resources). In the explanatory example of FIG. 8, data packets generated by the applications in the UE 401 are mapped to three QoS flows and marked with three different QFIs. Mapping QoS flows includes adding DRBs for transferring the three QoS flows. Consider that two DRBs (DRB-1 and DRB-2) have been added, in which two QoS flows marked with corresponding QFIs (QFI-1, QFI-2, and QFI-3) are included in one DRB (DRB-1) and the third QoS flow marked with a QFI (QFI-3) is included in another DRB (DRB-2). The UE 401 can generate CU-UP security keys for both DRBs.

The UE 401 can generate an integrity protection key $K'_{UPint}$ or a ciphering key $K'_{UPenc}$ pertaining to DRB-1 based on $K_{gNB}$, PDU session ID-1, QFI-1, QFI-2, DRB-1 ID, key generation technique identity, key generation technique type distinguishers, and other possible parameters. The UE 401 can generate an ciphering key $K''_{UPint}$ or a ciphering key $K''_{UPenc}$ pertaining to DRB-2 based on $K_{gNB}$, PDU session ID-2, QFI-3, DRB-2 ID, key generation technique identity, key generation technique type distinguishers, and other possible parameters. The UE 401 can protect the integrity of the data packets in the DRB-1 using $K'_{UPint}$ and encrypt the data packets in the DRB-1 using $K'_{UPenc}$. The UE 401 can protect the integrity of the data packets in the DRB-2 using $K''_{UPint}$ and encrypt the data packets in the DRB-2 using $K''_{UPenc}$.

The gNB CU-CP 407 (in the AN) can generate $K'_{UPint}$, $K'_{UPenc}$, $K''_{UPint}$, and $K''_{UPenc}$. The gNB CU-CP 407 can send CU-UP security keys $K'_{UPint}$ and $K'_{UPenc}$ to gNB CU-UP-1 408 (in the AN). The gNB CU-CP 407 can send CU-UP security keys $K''_{UPint}$ and $K''_{UPenc}$ to gNB CU-UP-2 408 (in the AN). The gNB CU-CP 407 can send the CU-UP security keys to the gNB CU-UP-1 408 and the gNB CU-UP-2 408 through dedicated E1 interfaces. The gNB CU-UP-1 408 can protect the integrity of the data in DRB-1, traversing through gNB CU-UP-1 408, using $K'_{UPint}$. The gNB CU-UP-1 408 can encrypt the data in DRB-1, traversing through gNB CU-UP-1 408, using $K'_{UPenc}$. The gNB CU-UP-2 408 can protect the integrity of the data in DRB-2, traversing through gNB CU-UP-2 408, using $K''_{UPint}$. The gNB CU-UP-2 408 can encrypt the data in DRB-2, traversing through gNB CU-UP-2 408, using $K''_{UPenc}$.

The embodiments disclosed herein can be implemented through at least one software program running on at least one hardware device and performing network management functions to control the network elements. The network elements shown in FIG. 4 can, depending on embodiments, be implemented as hardware device, software or a combination of hardware and software.

Certain embodiments according to this disclosure include methods, systems and non-transitory computer program products for generating CU-UP security keys (integrity protection key or ciphering key) in a disaggregated gNB architecture. The CU-UP security keys are generated for each DRB for securing data traversing through CU-UPs in each DRB. In certain embodiments, methods according to this disclosure may be implemented in whole or in part, as software, for example, a program written in Very High Speed Integrated Circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The embodiments of certain described herein could be implemented partly through hardware and partly through software. Alternatively, embodiments according to this disclosure may be implemented on different hardware devices, e.g. using a plurality of Central Processing Units (CPUs).

Figure 9:
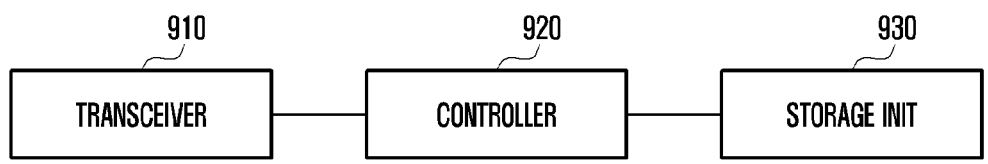
FIG. 9 shows the configuration of a user equipment according to an embodiment of the disclosure.

FIG. 9 shows the configuration of a user equipment (UE) according to an embodiment of the disclosure.

Referring to FIG. 9, the UE may include a transceiver 910, a controller 920, and a storage unit 930. In the embodiment, the controller 920 may be defined as a circuit, an application-specific integrated circuit, or at least one processor.

The transceiver 910 may transmit/receive signals to/from other network entities. The controller 920 may control overall operations of the UE according to the embodiment proposed in the disclosure. The storage unit 930 may store at least one piece of information transmitted/received through the transceiver 910 and information produced through the controller 1020.

Figure 10:
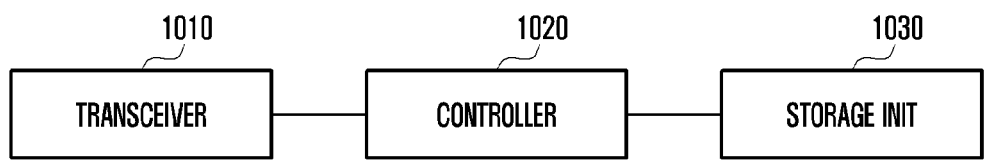
FIG. 10 shows the configuration of a base station according to an embodiment of the disclosure.

FIG. 10 shows the configuration of a base station according to an embodiment of the disclosure. The base station may correspond to the RAN node in the respective embodiments.

Referring to FIG. 10, the base station may include a transceiver 1010, a controller 1020, and a storage unit 1030. In the embodiment, the controller 1020 may be defined as a circuit, an application-specific integrated circuit, or at least one processor.

The transceiver 1010 may transmit/receive signals to/from other network entities. The controller 1020 may control overall operations of the base station according to the embodiment proposed in the disclosure. The storage unit 1030 may store at least one piece of information transmitted/received through the transceiver 1010 and information produced through the controller 1020.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for deriving Centralized Unit-User Plane (CU-UP) security keys for a disaggregated Next Generation Node B (gNB) architecture, the method comprising:
   receiving, by a User Equipment (UE), a Radio Resource Control (RRC) connection reconfiguration message for initiating at least one of protecting integrity of data and ciphering of the data in each Data Radio Bearer (DRB);
   extracting, by the UE, a plurality of parameters relevant to each DRB from the received RRC connection reconfiguration message; and
   generating, by the UE based on the plurality of parameters, for each DRB, at least one of: an integrity protection key and a one ciphering key, for at least one of protecting the integrity of the data and ciphering the data,
   wherein each RRC connection reconfiguration message comprises the plurality of parameters relevant to a DRB, for enabling the UE to initiate the at least one of protection of the integrity of the data and ciphering of the data,
   wherein the plurality of parameters comprises at least one of: a DRB Identity (ID), a Protocol Data Unit (PDU) session ID, a Quality of service Flow Indicator (QFI) pertaining to the DRB ID, and a counter value pertaining to the DRB,
   wherein each of the integrity protection key or the ciphering key for each DRB is generated based on the counter value pertaining to the DRB,
   wherein the counter value pertaining to the DRB is incremented after generation of the integrity protection key or the ciphering key,
   wherein the counter value is maintained by a gNB Control Unit Control Plane (gNB CU-CP) to which the UE is connected for a duration of an Access Stratum (AS) security context between the gNB CU-CP and the UE,
   wherein the counter value is initialized when an AS root key is generated by the gNB CU-CP, and
   wherein the AS root key is reset by the gNB CU-CP, by regenerating the AS root key prior to wrapping of the counter value pertaining to the DRB.

2. The method of claim 1, wherein the data is traversing through a gNB Control Unit-User Plane (gNB CU-UP) in the DRB, wherein the gNB CU-UP is present in at least one of: an Edge Data Centre (EDC), a gNB Distributed Unit (DU), and one of the EDC and a gNB DU operating in a predefined security domain.

3. The method of claim 1,
   wherein the RRC connection reconfiguration message is received if a gNB Control Unit-Control Plane (gNB CU-CP), to which the UE is connected, is aware of capability of the UE to generate the integrity protection key and the ciphering key, for each DRB,
   wherein the UE informs the gNB CU-CP about the capability of the UE to generate the integrity protection key and the ciphering key, for each DRB.

4. The method of claim 1,
   wherein the method further comprises:
   generating, by a gNB Control Unit Control Plane (gNB CU-CP) to which the UE is connected, the integrity protection key and the ciphering key based on the plurality of parameters relevant to each DRB, for each DRB, for protecting the integrity of the data and ciphering of the data when the data is traversing through a CU-UP of the gNB in each DRB.

5. The method of claim 4, further comprising:
sending, by the gNB CU-CP, the integrity protection key and the ciphering key, for each DRB, to the gNB CU-UP, for enabling the protection of the integrity of the data and the ciphering of the data; and
informing the UE of a capability of the gNB CU-CP to generate the integrity protection key and the ciphering key, for each DRB, based on the plurality of parameters in the RRC connection reconfiguration message.

6. The method of claim 1,
wherein each of the integrity protection key the ciphering key for each DRB is generated based on at least one of: a gNB key, a PDU session ID, a QFI ID, and a DRB ID, wherein the gNB key pertains to a gNB Control Unit Control Plane (gNB CU-CP) to which the UE is connected,
wherein the gNB CU-CP is one of a master node or a secondary node.

7. The method of claim 3,
wherein the capability of the UE to generate the integrity protection key and the ciphering key is determined by the gNB CU-CP based on one of: a parameter included in an AS release message received from the UE, and a parameter included in a message exchanged during either an AS procedure or a Non-AS (NAS) procedure.

8. The method of claim 7,
wherein the parameter exchanged during the AS procedure or the NAS procedure is included in one of: a N-2 PDU session request establishment request message received from an Access and Mobility Function (AMF),
wherein the UE sends the parameter to the AMF in at least one of a PDU session establishment request message, an AS security mode complete message, and a registration request message.

9. The method of claim 5,
wherein the gNB CU-CP informs the UE about the capability of the gNB CU-CP to generate a CU-UP integrity key and a CU-UP ciphering key for each DRB, in at least one of a RRC connection reconfiguration message, a registration accept message, an AS security mode command message, and a System Information Block (SIB) broadcast.

10. The method of claim 1,
wherein the method further comprises:
receiving, by the UE, at least one HANDOVER command message from a gNB Control Unit Control Plane (gNB CU-CP) to which the UE is connected,
wherein the at least one HANDOVER command message indicates the UE to generate at least one of the integrity protection key and the ciphering key,
wherein the integrity protection key and the ciphering key are generated for at least one of protecting the integrity of data in each DRB and ciphering the data in each DRB, when the data in each DRB is traversing through at least one CU-UP of another gNB.

* * * * *